Oct. 30, 1934.  W. S. SMITH ET AL  1,978,868
TREATMENT OF GUTTA PERCHA, BALATA, AND LIKE THERMOPLASTIC
NATURAL AND ARTIFICIAL PRODUCTS AND THE MANUFACTURE
OF MOLDED ARTICLES THEREFROM
Filed Dec. 11, 1929  2 Sheets-Sheet 2
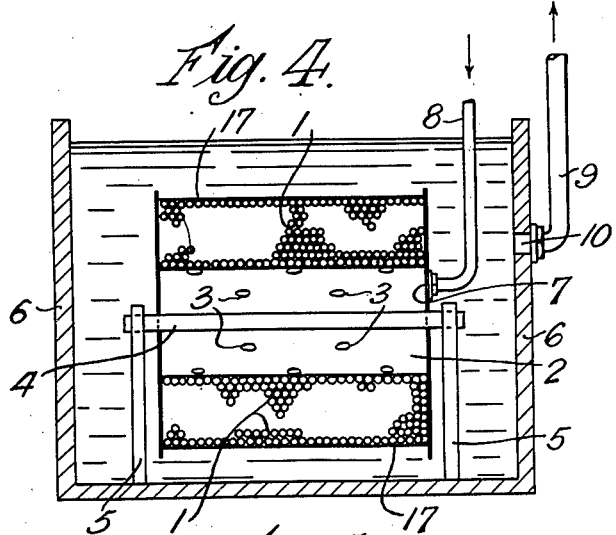
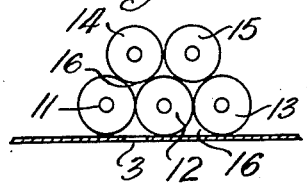
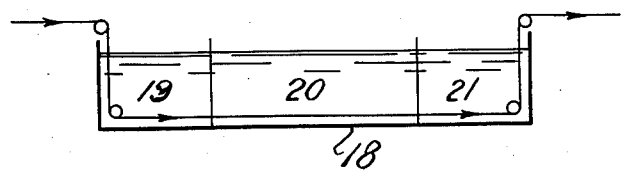

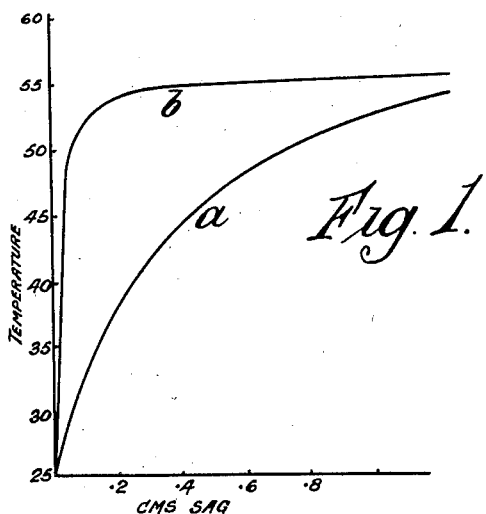
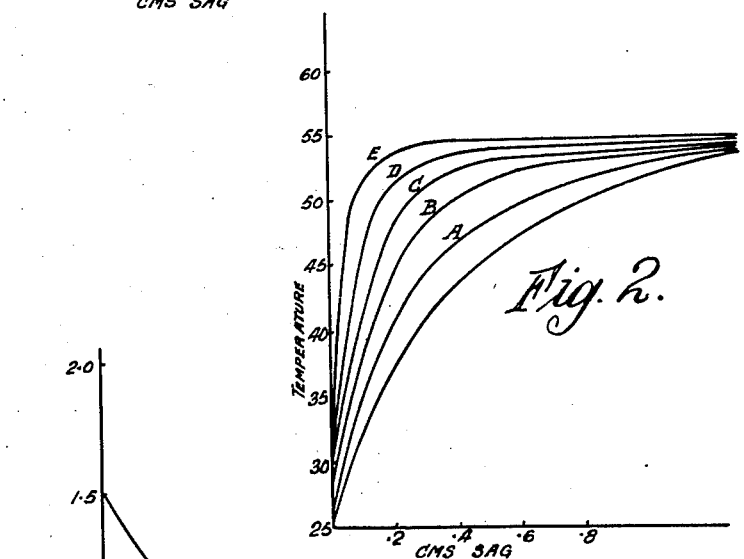
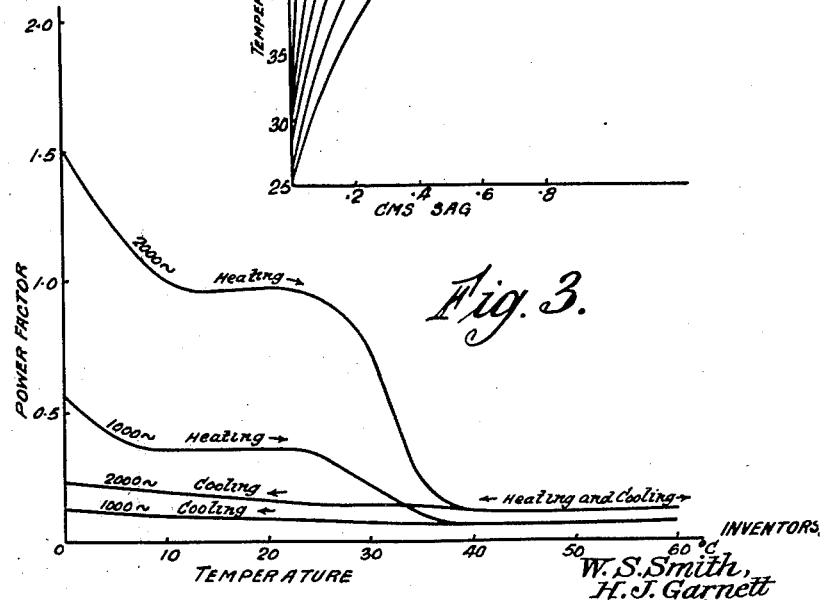

Patented Oct. 30, 1934

1,978,868

UNITED STATES PATENT OFFICE 1,978,868

TREATMENT OF GUTTA PERCHA, BALATA, AND LIKE THERMOPLASTIC NATURAL AND ARTIFICIAL PRODUCTS AND THE MANUFACTURE OF MOLDED ARTICLES THEREFROM

Willoughby Statham Smith, Benehams, Newton Poppleford, Henry Joseph Garnett, Solefields, Sevenoaks, and John Norman Dean, Orpington, England Application December 11, 1929, Serial No. 413,398 In Great Britain December 12, 1928

8 Claims. (Cl. 18—49)

This invention relates to improved method and apparatus for the heat treatment of gutta percha, balata, and like thermoplastic natural and artificial products and the manufacture of molded articles therefrom.

It is a well-known fact that when gutta percha (with reference to which the invention is hereinafter described and claimed and which term should be understood to comprise balata and its other allied gums whether in the form of a natural or artificial product as explained hereinafter) is heated, it gradually softens until it becomes quite plastic, in which condition it can be readily molded or extruded, while on cooling it regains its original solidity, retaining the shape imparted to it when hot by the mold. The molded or extruded gum retains these thermoplastic properties unimpaired. The temperature at which these gums become plastic varies with their quality, and is also very indefinite for any particular sample, that is, these gums do not possess a sharp melting point, but rather their properties gradually pass from those of a solid to those of a liquid, and vice versa, over a wide range of temperature.

The main object of this invention is a heat treatment of the gutta percha or articles formed therefrom whereby its normal melting or softening point is raised and also its mechanical electrical and water resistant properties are improved.

According to the present invention the gutta percha is subjected to heat treatment at a temperature lower than that which will cause it to melt or soften, that is a temperature below the limiting temperature, a definition of which is given later. The temperature at which this heat treatment is carried out varies with the properties of the gutta percha. It may also be varied in nature according to the state or condition of the gutta percha to be treated. In the case for example of a molded article where it is essential that no deformation in its shape shall take place it has been found preferable to subject the article to a step by step heat treatment; the gutta percha being heated to a temperature not high enough to render it sufficiently plastic to cause deformation of shape and maintained at that temperature for a considerable period. The gutta percha will gradually harden again at that temperature, after which the latter may be raised slightly. This is repeated until further heating will no longer harden the gutta percha. On the other hand when it is not essential that deformation shall not occur the heat treatment may take place at a temperature at which the gutta percha is in a plastic or semi-plastic condition while still below its limiting temperature the gutta percha being maintained at this temperature until hardening occurs.

In the manufacture of a molded article the gutta percha is heated to a temperature until it becomes plastic, when it is shaped and in some cases cooled and then subjected to a heat treatment in accordance with the invention.

The effect of the heat treatment on the properties of these thermoplastic materials differs however, from the well-known changes produced in the properties of metallic bodies as the result of annealing, inasmuch as, in the present case, the softening curve of the material is altered in shape after the treatment.

The invention is illustrated by means of the accompanying drawings in which Figures 1 and 2 are plasticity temperature curves, and Figure 3 a power factor temperature curve. Figure 4 is a diagrammatic elevation of one form of apparatus for carrying out the process of this invention; Figure 5 being a detail sectional view on a larger scale. Figure 6 is a lay out of the alternative form of apparatus.

Referring to the accompanying diagrams Figure 1 shows two curves, the curve $a$ being a typical curve connecting plasticity and temperature for gutta percha-like materials that have not undergone the treatment in accordance with the invention. The curve $b$ is a typical plasticity-temperature curve for a more chemically homogeneous substance. The curve $a$ indicates a gradually increasing plasticity with rising temperature, while the curve $b$ shows only a slight increase in plasticity until a certain temperature is reached, when there is a break in the curve indicating a sudden and very rapid increase in plasticity for a very small change in temperature.

It has now been found that whereas the plasticity-temperature curve of gutta percha or like materials subjected to normal heat treatment or when they are molded in the ordinary way is of the type shown at $a$, the corresponding curve for gutta percha or like materials or articles molded therefrom and heat treated in accordance with the invention, tends to approach the type of curve $b$.

These curves may be obtained by various methods. According to one method, a film of standard thickness of the substance is tied over one end of a tube of standard size and a definite weight of mercury is poured into the open end of the tube. The film-covered end of the tube is then heated in a suitable bath and the relative positions of the bottom of the sag determined with a vertical travelling microscope as the temperature is raised at a standard rate. On plotting the displacement of the lowest rate of the sag against the corresponding temperature, curves of one of the above mentioned types will be obtained.

It is clear therefore from these plasticity curves that, in order to preserve the shape of the object to be heat treated, the temperature at which the treatment begins must be so low that the material to be tested does not quite reach that plasticity which would allow deformation and flow to occur.

It has now been found that if the molded object of gutta percha is gradually heated to such a temperature, and kept at that temperature for a certain period, the material hardens. If now the temperature is increased, it will be found that the point at which harmful softening occurs is situated a little higher on the scale. The heating is arrested at a point just below this latter temperature and maintained at that value until the gutta percha has hardened again. This step-by-step process may be continued until the limiting temperature is reached. By the limiting temperature is here meant that temperature at which any further rise will cause softening of the gutta percha which will not be removed by continued heating at that temperature. It has been observed that the limiting temperature lies only just below the temperature approached asymptotically by the plasticity-temperature curve for the fully hardened material. It has also been found that if the limiting temperature is exceeded, even for a short period of time, the gutta percha is not only permanently softened at that temperature, but on cooling is found to have reverted to a state similar to its original condition; that is to say, after having been heated to too high a temperature, the gutta percha has a plasticity-temperature curve comparable with that indicated by curve a in Figure 1.

It will be realized that the actual value of the limiting temperature varies with the type and quality of the material undergoing treatment; thus while gutta percha of normal resin content such as is ordinarily used for the insulation of submarine cables has a limiting temperature of about 55° C., deresinated gutta percha has a limiting temperature of about 65° C.

It is obvious that, for any one particular type of gutta percha-like material, a method can be devised in which the temperature is made to rise continuously at such a rate that the material never softens, the heating being continued until the limiting temperature is reached.

Example 1

*Wire insulated with normal gutta percha cable mixture*

The core was heated for:

A  3 hours at _____ 38° C.
B  3 hours at _____ 43° C.
C  3 hours at _____ 46° C.
D  5 hours at _____ 49° C.
E  5 hours at _____ 50° C.

The changes in the softening-point temperature curves as a result of this treatment are shown in Figure 2 where the unmarked curve shows the softening point temperature curve of the untreated gutta percha and curves A—E of Figure 2 show the curves for the material after the corresponding treatments in the above table. One suitable method of carrying out this treatment in the case of gutta percha covered wires is described hereinafter but it is to be understood that the method of procedure may be varied somewhat to suit the apparatus at hand and the desired result to be obtained.

In the alternative method, the temperature of the gutta percha or the like is raised more rapidly to its limiting value and maintained there until the material has become hard. In this modification the material assumes a more fully plastic condition than it does in the previously described method, and in fact, in most cases it is sufficiently soft to flow under its own weight. This is therefore a very convenient method for removing grain or strain concomitantly with the hardening process in those cases where, for example, a shrunken sheet is required. This method may also be used with advantage for the heat treatment of articles made e. g. from gutta percha and contained in a mold, or otherwise supported, when of course, deformation cannot occur. By this more rapid method of heating, the total time required for hardening is very much less. The time may be further shortened by the introduction of "quenching". In the above mentioned example, if the material after it has been raised to the desired temperature, is chilled in cold water and then plunged back into a high temperature bath, a considerable hardening will have occurred over and above that observed in the sample treated as described above.

This chilling process may be called quenching and may be repeated several times with proportional increase in effect. It has also been observed that quenching may usually be applied with adavntage to the step-by-step process at its various stages. After quenching the gutta percha may be kept cool for any length of time until it is convenient to continue the treatment.

In large articles and with some types of gutta percha it is of distinct advantage to quench to a temperature below or well below air temperature.

Moreover in large articles it is obviously of advantage to cool slowly, subsequently to the heat treatment, thus preventing the setting up of internal mechanical strain and causing a hinderance to the process.

Example 2

*Ordinary cable mixture of gutta percha*

Method of treatment.—Heating to 50° C. direct and relative plasticity measured by depth of depression of a known and constant load at 50° C.

```
                                        Plasticity degrees
Initial plasticity _____ 28
After heating steadily 50 minutes_____ 23
Quenched once during 50 mins. heating____ 19
Quenched twice during 50 mins. heating__  6
Quenched 3 times during 50 mins. heating__  2½
Quenched 4 times during 50 mins. heating__  1
Quenched 5 times during 50 mins. heating__  1
```

Example 3

Another gutta percha cable mixture was heated to a temperature of 53.5° C. for 7 hours giving a result similar to curve E of Figure 2.

One important application of the process is in the manufacture of electrical conductors insulated with gutta percha or the like thermoplastic material. As is well-known, gutta percha and its allied gums have long been used for the insulation of submarine signalling conductors, and of other electrical conductors.

In the manufacture of electrical conductors insulated, for example, with gutta percha, the insulating material is rendered plastic by heat, extruded in this condition round the conductor, and then rapidly cooled, e. g. by passing the insulated conductor through a bath of cold water. It is obvious that the temperature of the bath may be adjusted to such a value that the heat treatment of the insulating material may be carried out in one process with the covering. It has been found, however, that the most rapid method consists in first chilling the core as it issues from the extrusion machine by passing it through a bath of cold water in the usual way, next passing the core into another division of the tank containing water heated to a suitable temperature and then passing it again into a cold bath in which the coated wire is circulated in the usual way until the insulating material has set (as described hereinafter with reference to Figure 6). This process may obviously be carried out at any convenient time either immediate or otherwise to the covering process.

Example 4

Normal gutta percha mixture was extruded on wire and passed through a chilling bath and on into a bath at 53° C. for two minutes and then chilled again in cold water until set. Result as in curve B of Figure 2.

It is sometimes found when heat treating a core by the last described method that the hardening of the insulation is not apparent until the gutta percha has cooled; subsequent heating of the gutta percha will however be found to cause less softening than prior to heating, owing presumably to the core having been quenched.

It should be understood that the heat treatment in accordance with the invention may be applied with advantage to molded articles of gutta percha or the like at any stage of their life.

Gutta percha and the like thermoplastic materials treated by one or a combination of the above processes, have superior properties to the same materials not so treated. Some of the effects of the heat treatment on the materials are stated below.

(1) The treated materials have a higher softening temperature. This is of advantage in the case of articles molded from gutta percha, for example, that are liable to be exposed to temperatures at which the material, as ordinarily manufactured, would become plastic.

(2) The treated materials are slightly more compact, as is manifested by a small increase in the density.

(3) As a result of the treatment, the very undesirable tendency of the natural resins in the lower grade qualities of the natural gums, and especially the resins in some qualities of balata, to "sweat" is almost entirely prevented.

(4) The treated materials are less affected by vapours, such as those from tar.

(5) The treated materials, especially those containing resins, show far less tendency to disintegrate under water and their value is thereby greatly enhanced.

(6) The electrical constants of the material, for example the specific resistance, the dielectric constant and the power factor, are rendered more stable by the treatment and are less prone to the effects of water when the material is immersed therein.

The explanation of the above described increased electrical stability of ordinary resin-containing guttas no doubt lies in the great improvement in their general mechanical properties as noted in 1-5 above. In the case of materials in which all or most of the resins have been removed and especially in the case of materials described in United States patent to Willoughby Statham Smith, et al. 1,912,548, of June 6, 1933 it has been found that in most cases when immersed in water there has been an abnormal and rapid rise in dielectric constant and power factor, but no abnormal rise in the very small amount of water absorbed. This phenomenon is no doubt the cause of previous failures in the use of these highly purified materials and has caused them to be considered as unsuitable for submarine cable insulation.

It has been observed that in the course of time some of the materials so affected have returned to normal figures for the dielectric constant and power factor. Now as this period of time is in many cases very long and varies greatly from months to years, it is impossible to attempt to use these materials for submarine cable insulation without some treatment to increase stability.

Experiment has shown that, if, at any stage in the life of a conductor insulated with one or a mixture of these materials, the core is submitted to a suitable process of heat treatment as described, the electrical properties and in particular the dielectric constant and power factor, are no longer affected by the immersion of the core in water and no abnormal change in their electrical properties can be detected, moreover in those cases where the change has already partly or wholly occurred, then a return to almost original figures will be manifested immediately.

Example 5

(a) *Commercial gutta percha freed from dirt and resin and containing preservative, and kept under water*

| Properties measured | Initial figures | After 1 month (untreated) | After heat treatment | After 6 months (treated) |
|---|---|---|---|---|
| Dielectric constant at 32° F., 2,000 cycles per second | 2.63 | 3.14 | 2.79 | 2.88 |
| Power factor at 32° F., 2,000 cycles per second | 0.27% | 3.20% | 0.24% | 0.27% |

(b) *Balata, freed from dirt and resin, and kept under water*

| Properties measured | Initial figures | After 1 month (untreated) | After heat treatment | After 6 months (treated) |
|---|---|---|---|---|
| Dielectric constant at 32° F., 2,000 cycles per second | 2.81 | 5.95 | 3.12 | 3.30 |
| Power factor at 32° F., 2,000 cycles per second | 0.32% | 12.6% | 0.20% | 0.23% |

This return to normal electrical figures can also be accomplished by heating the gutta percha to a minimum temperature of approximately 105° F., though the values are usually found to be more constant when the gutta percha is heated according to one of the methods specified in the examples. Thus, by experiment, curves which are shown in Figure 3 were obtained using a sample of deresinified and dirt free gutta percha previously kept in water for 5 weeks with electrical values already showing the anomalous rise.

The present invention is also applicable to certain gutta percha substitutes and their mixtures with gutta percha and its allied gums as for example those described in the copending application of Willoughby Statham Smith et al. Serial No. 383,416, filed August 3, 1929, which on June 5, 1934, matured into Patent 1,961,306 and also to mixtures of gutta percha and rubber with or without the above mentioned substitutes.

These two admixtures are mentioned only by way of example and the invention is not limited thereto. It has been observed, however, that generally speaking the smaller the proportion of gutta percha present the less noticeable is the effect of this treatment. It will be found that with a definite proportion of gutta percha the effect will vary considerably with the kind of diluent added.

There is now described apparatus for heat treating gutta percha, balata and like thermoplastic natural and artificial products and particularly for carrying out the heat treatment of this invention.

The apparatus hereinafter described has been designed for conducting a heat treatment of the gutta percha insulation of loaded and unloaded electric signalling cables immediately following the operation of extrusion of the gutta percha upon the conductor or wire and after the length of insulated conductor has been wound upon a drum.

In the manufacture of submarine cables, the copper conductor is insulated in separate lengths generally of about two miles which, after the gutta percha that has been extruded in a plastic state around the conductor has set, are wound separately on to large metal drums.

In one form of apparatus the conductor on which the gutta percha has been extruded is treated in lengths while wound upon the drum.

In another form the conductor is wound from one drum to another, passing on the way through a water or other heat treating bath where the proper heat treating temperature is developed.

Referring to Figures 4 and 5 of the drawings, 1 indicates the conductor insulated with gutta percha, and which has been evenly wound in layers of closely abutting spirals around a winding drum 2, which is provided with holes 3, suitably about ½″ in diameter, evenly distributed over the surface of its belly. For a drum of the dimensions commonly used in submarine cable manufacture, about twenty holes may be provided, but the exact number is not important. The drum is mounted on a spindle 4, which may be fixed and by means of which the drum may be lowered and removed from supporting posts 5 in a tank 6 in which the drum is completely immersed in water. Arrangements must be provided to heat the water in the tank to such a temperature and maintain it thereat as will cause the changes described above to occur in the gutta percha. An inlet hole 7 about 1″ in diameter, is provided in one of the flanges of the drum to give access to the interior of the drum 2 upon which the conductor is wound. A pipe 8 connected to a pump (not shown) is tightly fitted into the inlet 7. By the action of the pump, water is withdrawn from the tank through a pipe 9 connected to an outlet 10 and forced back again under pressure through the pipe 8 and inlet 7 into the interior of the drum.

Referring now to Figure 5, 11, 12 and 13 represent cross-sections through adjacent abutting turns of the insulated conductor wound upon a part of the drum, while 14 and 15 represent a cross-section through the superposed abutting turns of insulated conductor in the next layer. It is obvious that a continuous spiral channel, the cross-section of which is indicated at 16, follows the conductor round the drum passing with it from layer to layer.

Water in the space inside the cylindrical body of the drum is forced by the action of the pump through some of the holes 3, into and through these spiral channels 16 between the conductors, until it finally emerges at the outer layer of wound conductor and mingles with the main bulk of water in the tank. In this way, therefore, a continuous circulation of water heated to the proper temperature for the heat treatment is circulated over substantially the whole of the outer surface of the gutta percha insulation, thus raising the gutta percha to the proper temperatures in a perfectly uniform manner and maintaining it at those temperatures until the desired changes have taken place. The outermost layer of conductor may be covered with a rubber sheet 17.

In some cases the drums are made so that the spindle can be removed. When such a drum is used, the inlet hole 7, may be dispensed with. After removal of the spindle the hole in one of the flanges is closed and the pipe 8 fixed into the hole in the other flange. In this case the water may be stirred by causing the drum to rotate.

Obviously the water can be caused to circulate in the opposite direction round the spiral channel by reversing the action of the pump so that it exerts a suction instead of a pressure through the pipe 8.

In the alternative form of apparatus the water has free access to the gutta percha so that the latter may be uniformly heated throughout its mass.

Referring now to Figure 6, the conductor is passed over pulleys situated in a tank 18 having heating and cooling compartments shown respectively at 19, 20 and 21.

It is obvious that when the heat treating process is not carried out continuously with the covering, the preliminary cooling bath 19 is unnecessary and may be omitted from the machine. The lengths of the separate compartments are made to suit the process required in relation to the speed of travel of the core.

A representative example would be No. 1, 3½ minutes, No. 2, 2 minutes and No. 3, 4 minutes. The heating bath may obviously be heated by any suitable means such as for example, steam or gas jets, and should preferably, though not necessarily, be controlled thermostatically. The cooling baths may of course be cooled artificially with ice or by circulation of cold water or brine and the compartments may be shorter the lower the temperature of the cooling medium.

Compartments 20 and 21 are of necessity in one straight line, but need not be joined as shown in the diagram. They need not however be in line with 19 since the core issuing from the latter bath is cold and set, and any convenient arrangement or alignment is permissible.

In either of these methods, any liquid or gas that has no harmful action on the gutta percha may be used in the place of the water as the heating medium, but water is preferred because of its high specific heat and its cheapness.

Another method of heat treating the gutta percha upon an insulated electrical conductor is by passing through the conductor an electric current of such a strength that the temperature of the gutta percha is raised to and maintained at such a value as will cause the changes described above to occur in the gutta percha. Either a direct or alternating current can be used. Heat is generated in the conductor by the passage of the current and passes by conduction to the gutta percha insulation. The temperature of the conductor can be determined by measuring its ohmic resistance during the process.

The principal advantages of this last described method of heat treatment are the ease of control, conomy of space and labour, and cleanliness combined with the means of ascertaining and controlling the exact temperature of the material.

If the ohmic resistance of the insulated conductor is automatically recorded by known means upon a chart, the curve will show the course of the heat treatment and the recording pyrometer may be made to control the treatment. As the change of temperature is very gradual it can be assumed that the temperature of the gutta percha will lag but little behind that of the copper.

In some cases it may be preferable to use the electrical method of heat treatment to assist or control the methods previously described in the specification.

What we claim is:—

1. A method for the treatment of gutta percha material, balata material, and thermoplastic materials containing the same which comprises subjecting the material to a heat treatment at a temperature below its limiting temperature, and maintaining it at that temperature for a considerable period until hardening has occurred substantially as described.

2. A method for the treatment of gutta percha material, balata material, and thermoplastic materials containing the same which comprises subjecting the material to a heat treatment at increasing stages of temperature and maintaining the material at each stage of temperature until hardening occurs, when the temperature is raised and the heat treatment continued at that temperature until the material has again hardened, the temperature of the final stage being below the limiting temperature of the material substantially as described.

3. A method for the treatment of gutta percha material, balata material, and thermoplastic materials containing the same which comprises subjecting the material to a heat treatment at a temperature below its limiting temperature and then rapidly chilling and reheating the material to the same temperature, at which temperature it is maintained until hardening has occurred substantially as described.

4. A method for the treatment of gutta percha material, balata material, and thermoplastic materials containing the same which comprises alternately subjecting the material to a heat treatment at increasing stages of temperature and maintaining the material at each stage of temperature until hardening occurs, the material being rapidly cooled after each stage of treatment and then reheated to the temperature of the next stage and the heating continued at that temperature until hardening again occurs, the temperature of the final stage being below the limiting temperature of the material substantially as described.

5. A method of forming insulation on signalling conductors consisting in subjecting gutta percha material, balata material, and thermoplastic materials containing the same to a heat treatment at a temperature below its limiting temperature, extruding such material at a temperature below its limiting temperature onto a conductor, and maintaining it at that temperature for a considerable period until hardening has occurred.

6. A method of forming insulation on signalling conductors consisting in subjecting gutta percha material, balata material, and thermoplastic materials containing the same applied to a conductor to a heat treatment at increasing stages of temperature and maintaining the material at each stage of temperature until hardening occurs, when the temperature is raised and the heat treatment continued at that temperature until the material has again hardened, the temperature of the final stage being below the limiting temperature of the material.

7. A method of forming insulation on signalling conductors consisting in subjecting gutta percha material, balata material, and thermoplastic materials containing the same applied to a conductor to a heat treatment at a temperature below its limiting temperature and then rapidly chilling and reheating the material to the same temperature, at which temperature it is maintained until hardening has occurred.

8. A method of forming insulation on signalling conductors consisting in alternately subjecting gutta percha material, balata material, and thermoplastic materials containing the same and applied to a conductor to a heat treatment at increasing stages of temperature and maintaining the material at each stage of temperature until hardening occurs, the material being rapidly cooled after each stage of treatment and then reheated to the temperature of the next stage and the heating continued at that temperature until hardening again occurs, the temperture of the final stage being below the limiting temperature of the material.

WILLOUGHBY STATHAM SMITH.
HENRY JOSEPH GARNETT.
JOHN NORMAN DEAN.